UNITED STATES PATENT OFFICE 2,458,859

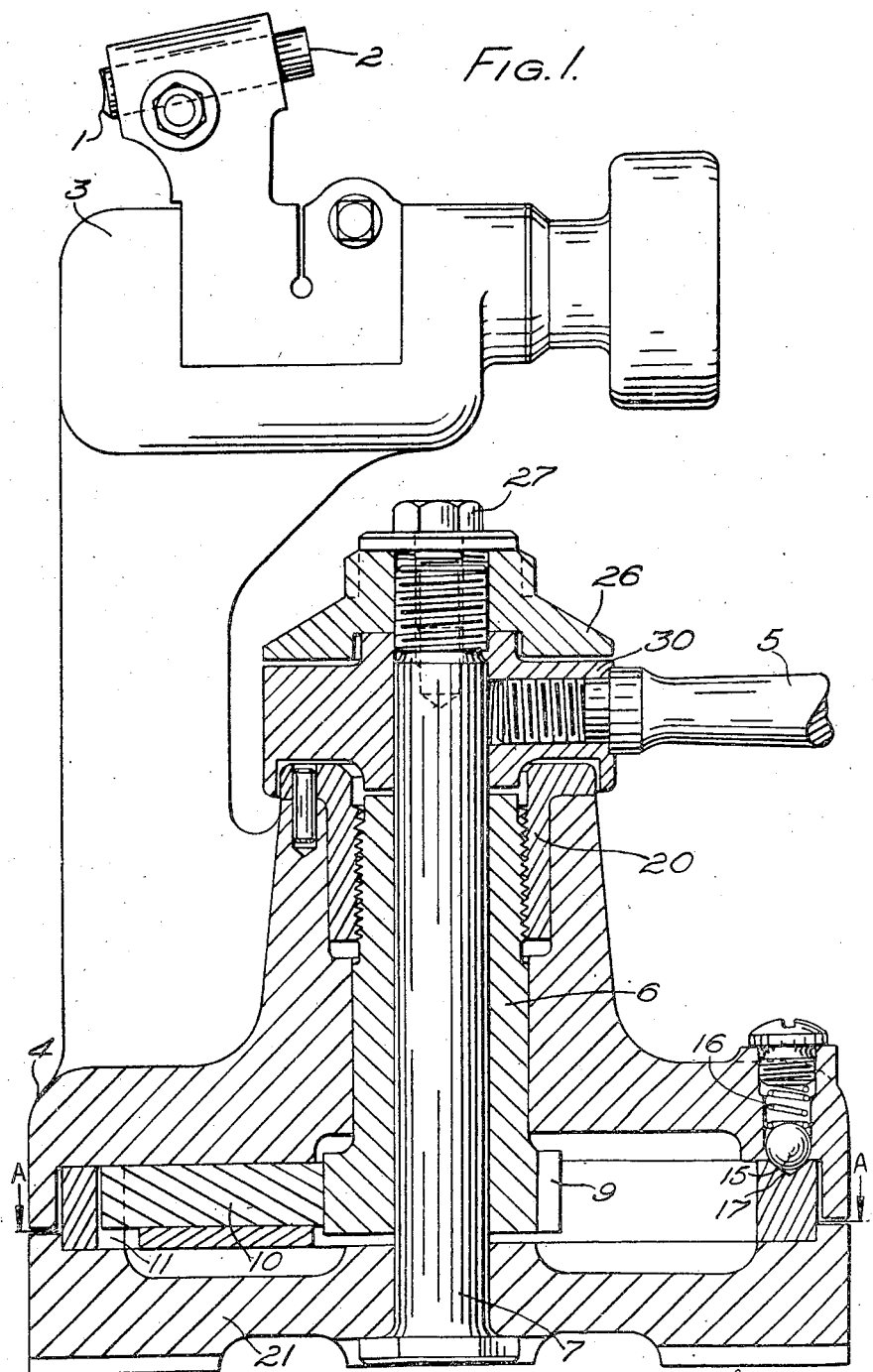

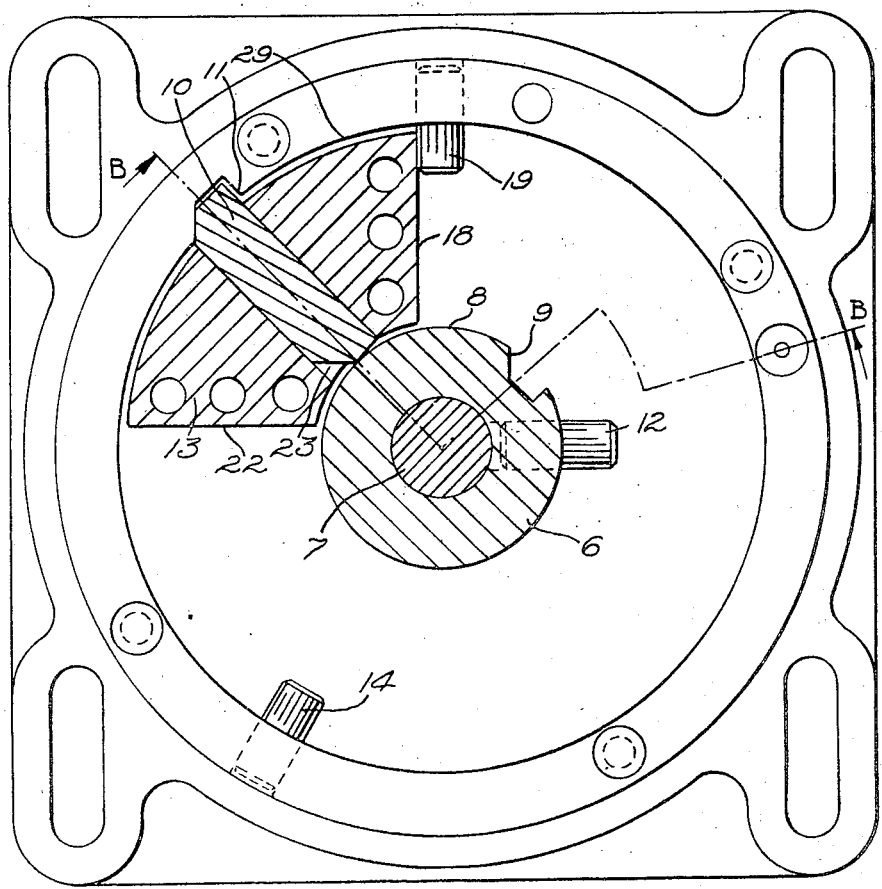

LOCATING AND LOCKING MEANS

Thomas Aubrey Kestell, Thurmaston, England, assignor to Power Jets (Research & Development) Limited, London, England Application November 15, 1945, Serial No. 628,757
In Great Britain September 14, 1945

10 Claims. (Cl. 74—527)

1

The present invention relates to an apparatus for enabling an element, for example a tool or a carriage for a tool, to be brought up to a pre-determined position, for example by the movement of a lever, and then locked in this position by the continued movement of said lever, the locking means used being inoperative to lock said element except when the latter is in the said pre-determined position.

For this purpose the apparatus according to the invention comprises means for moving the element up to a pre-determined position and means for locking the element in the said position, the moving means comprising a movably mounted member adapted to be operable when moved in one sense to move the element towards the said position, and the said locking means being adapted to be operable to lock the said element only upon the continued movement in the same sense of the said member.

In one suitable form of embodiment the element may be supported on a bracket mounted for rotation, which bracket may be of annular form, a sleeve being rotatably mounted within the bracket. The sleeve and bracket may be adapted to be rigid with one another over a limited rotational path so that rotation of the sleeve (for example by means of a suitably attached lever) over this path in one sense brings the bracket and hence the element supported thereon to a pre-determined position. Stop means may be provided for preventing the bracket from rotating beyond the said position and the sleeve and bracket may be further adapted so that continued rotation of the sleeve in the same sense operates locking means provided on the bracket and/or the sleeve to lock the bracket and hence the element supported thereon in the required position.

By way of example, one form of embodiment of the invention will be described with reference to the accompanying drawings in which: Fig. 1 is a longitudinal view in part section on the line B—B—B—B—B of Fig. 2, and Fig. 2 is a part section on the line A—A of Fig. 1.

Referring to Fig. 1, a tool which in the example illustrated is shown as a diamond 1, is carried in a tool holder 2 mounted on a bracket 3.

The said bracket 3 is rigid with a carriage 4 which is itself rigid with, and adapted to be rotated by means, of a sleeve 6 mounted on a shaft 7 and rigid with an operating handle 5 through a collar 30.

In the position shown in Fig. 2, the sleeve 6 and therefore the carriage 4 is shown in its locked

2 position which is adjusted to be the correct position for the operation of the diamond 1. The sleeve 6 has an eccentric surface 8 and is provided with a recess 9 adapted to co-operate with one end of a pin 10 of which the other end is adapted to co-operate with a recess 11 in a fixed ring 29. Pin 10 is also slidable within a slot 23 in a quadrant shaped plate 13 which is rigid with carriage 4.

The sleeve 6 is also provided with a pin 12 which is adapted to strike the face 18 of plate 13 when handle 5 and hence the sleeve 6 are appropriately rotated (anticlockwise in the drawing). Upon continued rotation of handle 5 in the same sense, the pin 12 moves plate 13 around and at the same time movement of said plate 13 ejects pin 10 out of its recess 11.

Upon still further rotation of handle 5, the sleeve 6 with plate 13, pin 10 and carriage 4 all move together and this rotation continues until the face 22 of plate 13 contacts a pin 14, when further motion of carriage 4 is prevented. This is the extreme position in one sense which the carriage 4 is capable of occupying and in this position a ball plunger 15 is urged by a spring 16 into a depression 17 in the ring 29 so as to hold the carriage 4 in this position.

When it is desired to bring the tool 1 to the required position, the operating handle 5 is moved in a reverse direction to that required for the above operation, i. e. clockwise in the drawing. The first consequence of this movement is to release the carriage 4 (and its associated assembly) from the ball plunger 15 and upon continued rotation of the operating handle 5 and sleeve 6, the plate 13 is moved back in a clockwise direction until its face 18 contacts pin 19 and simultaneously pin 10 enters recess 11.

Upon further rotation of the handle 5 and the sleeve 6 in the same sense, on account of the eccentric surface 8 on said sleeve 6, the pin 10 is forced into the recess 11 and at the same time a locking effect is produced by means of the following arrangement; a flanged bush 20 rigid with carriage 4 is screw threaded on sleeve 6 and rotation of said sleeve 6 therefore tends to produce upward or downward movement of said sleeve depending on the direction of rotation of the handle 5. If this direction of rotation is such that the sleeve 6 is urged upwards, then this movement is transmitted through shaft 7 into an upwards force in the base 21 and a downward force in the carriage 4 and these forces produce a clamping effect along the face between the carriage 4 and the fixed ring 29.

The handle 5 is rigid with collar 30 which is tongued to the sleeve 6 so that collar 30 and sleeve 6 are rigid in a rotational sense but are capable of slight relative vertical movement. A nut 26, locking screw 27, and washer 28 are used for setting the initial position of shaft 7. Correlation between the clamping of carriage 4 and the locking of pin 10 in recess 11 is adjusted by means of nut 26. With the said nut unlocked, handle 5 is turned until pin 10 is locked firmly in recess 11. The nut 26 is then tightened until carriage 4 is clamped to ring 29 and in this position nut 26 is locked by means of screw 27. The apparatus is then ready for use.

By means of the above described arrangement the tool 1 carried on the bracket 3 can be locked in a position which is determined by the position of the recess 9, pin 10 and recess 11 and can be locked only in this position. In all other positions of the bracket 3, rotation of handle 5 can produce no clamping effect. Thus with the aid of the apparatus described above the tool must be brought to its correct position by the operator and cannot be locked in any position other than the correct one.

I claim:

1. Apparatus for locating an element to a predetermined position and locking said element in said position comprising means for moving said element towards said position, means for preventing movement of said element beyond said position, and locking means for locking said element in said position, the said moving means comprising a rotatably mounted member adapted to be operable when rotated in one sense to move the element to the said position, and the said locking means being adapted to be operable only upon the continued rotation in the same sense of the said member beyond said position.

2. Apparatus for locating an element to a predetermined position and locking said element in said position comprising means for moving said element towards said position, means for preventing movement of said element beyond said position, and locking means for locking said element in said position, the said moving means comprising a rotatably mounted member adapted to be operable when rotated in one sense to move the element to the said position, and the said locking means being at least in part integral with said member and adapted to be operable only upon the continued rotation in the same sense of the said member beyond said position.

3. Apparatus for locating an element to a predetermined position and locking said element in said position comprising means for rotating said element towards said position, means for preventing rotation of said element beyond said position, and locking means for locking said element in said position, at least part of said locking means being also at least part of said element rotating means, said part being adapted to be given a limited rotation in one sense while operable only to move said element to said position, and upon continued rotation in the same sense to be operable only to lock said element in said position.

4. Apparatus for locating an element to a predetermined position and locking said element in said position comprising a support for said element, means for rotating said support, means for preventing rotation of said support in at least one direction beyond said position, and locking means for locking said support in said position, said locking means and said rotating means comprising a common rotatable member adapted to be rigid with said support over only a limited rotational path in one sense to move said element to said position and upon continued rotation of said member in the same sense to be operable only to lock said support in said position.

5. Apparatus for locating an element to a predetermined position and locking said element in said position comprising a support for said element, means for rotating said support, means for preventing rotation of said support in at least one direction beyond said position, and locking means for locking said support in said position, said rotating means comprising a rotatable sleeve mounted co-axially within said support and adapted to be rigid with said support over only a limited rotational path and upon continued rotation of said sleeve in the same direction to be operable only co-operate with and lock said support.

6. Apparatus for locating an element to a predetermined position and locking said element in said position comprising a support for said element, means for mounting said support for rotation, means for preventing rotation of said support in at least one direction beyond said position, a rotatable sleeve mounted co-axially within said support and provided with a recess adapted to engage over a limited rotational path of said sleeve with a pin rotatable with and slidable in a projection on said support and adapted upon continued rotation of said sleeve in the same direction to be operable only to co-operate with and lock said support.

7. Apparatus for locating an element to a predetermined position and locking said element in said position comprising a rotatably mounted annular support for said element, a stationary member, a rotatable sleeve mounted co-axially within said support and provided with a recess adapted to engage over a limited rotational path of said sleeve with one end of a pin which is rotatable with and slidable in a projection on said support, the other end of said pin being adapted to engage with a recess in said stationary member, and an eccentric surface on said sleeve whereby upon continued rotation of said sleeve beyond that corresponding to the pre-determined position of said support the said surface urges said pin into said recess in said stationary member.

8. Apparatus according to claim 7 comprising a bush rigid with said annual support and screw threaded to said sleeve.

9. Apparatus according to claim 7 comprising a lever rigid with a collar which is rigid with said sleeve in a rotational sense but is capable of anial movement relative to said sleeve, a shaft co-axially disposed within said sleeve and rigid with said handle and means for adjustably setting the spatial relationship between said collar and said sleeve.

10. Apparatus for locating an element to a predetermined position and locking said element in said position comprising means for moving said element towards said position, means for preventing movement of said element beyond said position, and locking means for locking said element in said position, the said moving means comprising a rotatably mounted member adapted to be operable when rotated in one sense to move the element to the said position, and the said locking means being adapted to be operable only upon the continued rotation in the same sense of the said member beyond said position, and to be rendered inoperative only upon a movement in the reverse sense of the said member.

THOMAS AUBREY KESTELL.

REFERENCES CITED

The following references are of record in the file of this patent:

UNITED STATES PATENTS

| Number | Name | Date |
|---|---|---|
| 1,072,283 | Waters et al. | Sept. 2, 1913 |
| 1,855,939 | Collins | Apr. 26, 1932 |
| 1,900,852 | Kuppersmith | Mar. 7, 1933 |
| 2,072,877 | Green | Mar. 9, 1937 |
| 2,214,730 | Jeffers | Sept. 17, 1940 |
| 2,318,480 | Albrecht et al. | Aug. 7, 1945 |

FOREIGN PATENTS

| Number | Country | Date |
|---|---|---|
| 563,676 | France | Oct. 3, 1923 |